US007003736B2

(12) United States Patent
Kanevsky et al.

(10) Patent No.: US 7,003,736 B2
(45) Date of Patent: Feb. 21, 2006

(54) ICONIC REPRESENTATION OF CONTENT (75) Inventors: Dimitri Kanevsky, Ossining, NY (US); Clifford A. Pickover, Yorktown Heights, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 09/770,978

(22) Filed: Jan. 26, 2001

(65) Prior Publication Data
US 2002/0140744 A1 Oct. 3, 2002

(51) Int. Cl.
*G09G 5/00* (2006.01)
(52) U.S. Cl. ..................... 715/837; 715/838
(58) Field of Classification Search .............. 345/738, 345/739, 748, 810, 837, 838, 839, 836, 846, 345/977; 707/102, 205, 515; 715/837, 838, 715/738, 739
See application file for complete search history.

(56) References Cited

U.S. PATENT DOCUMENTS

| | | | | |
|---|---|---|---|---|
| 5,680,558 A * | 10/1997 | Hatanaka et al. | ........... | 345/838 |
| 5,708,825 A * | 1/1998 | Sotomayor | ............... | 715/501.1 |
| 6,182,090 B1 * | 1/2001 | Peairs | ......................... | 715/500 |
| 6,332,145 B1 * | 12/2001 | Kawasaki et al. | ....... | 707/104.1 |
| 6,353,824 B1 * | 3/2002 | Boguraev et al. | .............. | 707/5 |
| 6,469,722 B1 * | 10/2002 | Kinoe et al. | ................. | 715/837 |
| 6,496,206 B1 * | 12/2002 | Mernyk et al. | ............. | 345/835 |
| 6,590,584 B1 * | 7/2003 | Yamaura et al. | ............ | 715/704 |
| 6,693,652 B1 * | 2/2004 | Barrus et al. | ............... | 715/838 |
| 6,857,102 B1 * | 2/2005 | Bickmore et al. | ........ | 715/501.1 |
| 2002/0038299 A1 * | 3/2002 | Zernik et al. | ................... | 707/3 |
| 2002/0143821 A1 * | 10/2002 | Jakubowski | ................ | 707/522 |
| 2003/0014415 A1 * | 1/2003 | Weiss et al. | .................. | 707/10 |
| 2003/0079179 A1 * | 4/2003 | Brown et al. | ............ | 715/501.1 |

* cited by examiner

*Primary Examiner*—Ba Huynh
(74) *Attorney, Agent, or Firm*—Scully, Scott, Murphy & Presser; Daniel P. Morris (57) ABSTRACT A method and apparatus for determining and displaying icons representing files containing text, such as e-mail, web pages, text documents, word-processor documents, etc. In particular, the system determines the content of the text by examining words in the document. For example, if words relating to cars appear several times in the document, then the document's topic probably relates to car. Next, the system searches in a database of icons, which are labeled according to type. For example, the database may contain graphics relating to transportation (cars, planes, trains, etc.) computers (hard disk, monitor, keyboard, etc.), animals (mammal, reptile, amphibian), and many other categories. The system chooses the closest icon available and displays it as the icon representing the text document. (For example, the system may associate the document on cars with a car icon, and the car icon is displayed in appropriate regions of the desktop such as in file listings, desktop shortcuts, menus task bars, etc.).

18 Claims, 6 Drawing Sheets

ICONIC REPRESENTATION OF CONTENT

BACKGROUND OF THE INVENTION

1. Field of the Invention

This invention generally relates to computer user interfaces. More specifically, the invention relates to a method and system for improving the searching of computer files via representation of their content as icons.

2. Prior Art

Many functions in modern computers can be very time consuming. From having to wait to turn on the computer, waiting for all programs to load, and then finally having to wait to determine what each file contains. For example, a user is not familiar with a certain computer may want to find a file about car mechanics. That person would probably have to go to a separate directory, such as DOS, Windows Explorer, etc., in order to be able to find a certain file. After reaching the separate directory, the user would have to specify a search on all the files in a drive. After this long search a user would have to go through each file and read about the file and then sooner or later find the file they were looking for.

Another method to solve this problem is to conduct a basic search for file names on the computer's operating system. After conducting the search, the user would have to browse through different files and open every file separately and check to determine if the file is the one needed.

This can be a very long and useless process because of the amount of work needed to open and search through drives and directories. Other searches that compare keywords with text in documents can also be frustrating, especially for beginning users.

This process is also extremely lengthy and sometimes even pointless when considering the number of files that could show up in one file search. This method is very time consuming because of the fact that before the user finds the file he/she is looking for, they may have to go through opening a large number of files.

Another method is to use the icons listed throughout the drives and the desktop. By right clicking on an icon, the user can get a basic menu. Typically, one of the options on the menu is "properties," which allows the user to view a small number of details about the file.

This process of trying to find a file is very unlikely to be helpful because it is almost a guess to as what files are the ones needed. The user would have to go through a large amount of files before he/she finds the one needed. This method is also very time consuming because the user would have to go through a number of files and spend a few minutes looking over the details of the files. Another reason why this method is not very helpful is because the details listed by the properties function are not very informative about the file's content.

SUMMARY OF THE INVENTION

An object of this invention is to be able to provide a user, regardless of whether the user is familiar or not familiar with a computer, with an easily accessible method to find programs or any files that he or she needs without taking up too much time or patience.

Another object of the present invention is to provide a versatile system for determining and displaying icons representing files or portions of files containing text such as e-mail, web pages, text documents, word-processor documents, etc.

A further object of the present invention is to determine the content of the text of a document by examining words in the document, and then choosing the closest icon available and displaying it as the icon representing the text document.

These and other objectives are attained with a method and apparatus for determining and displaying icons representing files containing text, such as e-mail, e-books, web pages, text documents, word-processor documents, etc. In particular, the system determines the content of the text by examining words in the document. For example, if words relating to cars appear several times in the document, then the document's topic probably relates to car. Next, the system searches in a database of icons, which are labeled according to type. For example, the database may contain graphics relating to transportation (cars, planes, trains, etc.) computers (hard disk, monitor, keyboard, etc.), animals (mammal, reptile, amphibian), and many other categories. The system chooses the closest icon available and displays it as the icon representing the text document. (For example, the system may associate the document on cars with a car icon, and the car icon is displayed in appropriate regions of the desktop such as in file listings, desktop shortcuts, menus, task bars, etc.)

One way for the system to select an appropriate icon is by comparing a content word from a document, such as car, with the database of icons, which also contains words associated with each icon. As an example, the database may contain records containing words and names of icon (graphical image) files:

Icon Database:

| Text | Icon file name |
| --- | --- |
| car | car.jpg |
| dog | dog.jpg |
| keyboard | keyboard.jpg |
| amphibian | frog.jpg |
| frog | frog.jpg |

If the topic word is car, the system searches the text in the icon database for "car." When there is a match, the system reads the icon file name car.jpg and displays the icon. The image car.jpg may include an advertisement.

Various methods are available for determining the "content" of a document, or of the sections of a document. Such methods include latent semantic indexing, known to those skilled in the art of content determination, and examination of words in titles and headings, and in the body of a document. For example, if a chapter title in a document contains the word amphibian, the chapter likely is about amphibians, and an amphibian picture (e.g. frog.jpg) may be displayed.

As an extension of this basic principle, topic icons may be determined several times in a document. For example, the topic of one paragraph may be cars and another paragraph topic might be trains. These icons may be displayed in the text document so that people can get an idea about content of a document with a quick glance. The icons may also be displayed outside the document so that users can get an idea as to the nature and progression of sub topics in the document, and users may easily select sub topics by selecting the icons. For example, the overall content of a document might be displayed for each file in a Windows Explorer listing of files. "Overall content" might be determined by examining all the words in the entire document. Progressive content, represented by several icons, can be displayed next to paragraphs displayed in a display program (e.g. word processor, browser, etc.) or as a sequence of icons displayed elsewhere on the user's graphical user interface.

This method provides a visual mechanism for locating and understanding the idea of a document, the location of files, in a user hard disk and their content.

This method can also help many people because very many computer users often make simple mistakes that can take from a few minutes or to an hour to fix. By making this easy method of choosing a desired file without the need to check to see if it's the file needed (and then only to discover that it's the wrong file and then having to go searching for the right file) the method is a very fast and effective way to operate a user's desktop.

The way this method of easy access to files is used is by first having all the information about a file summed up and then put into a simple phrase that includes what the content of the file is. The icon of the file is also somehow relevant to what it contains. This is done so the user can just glance at a file and be able to define what the file contains and if it is what the user is looking for.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
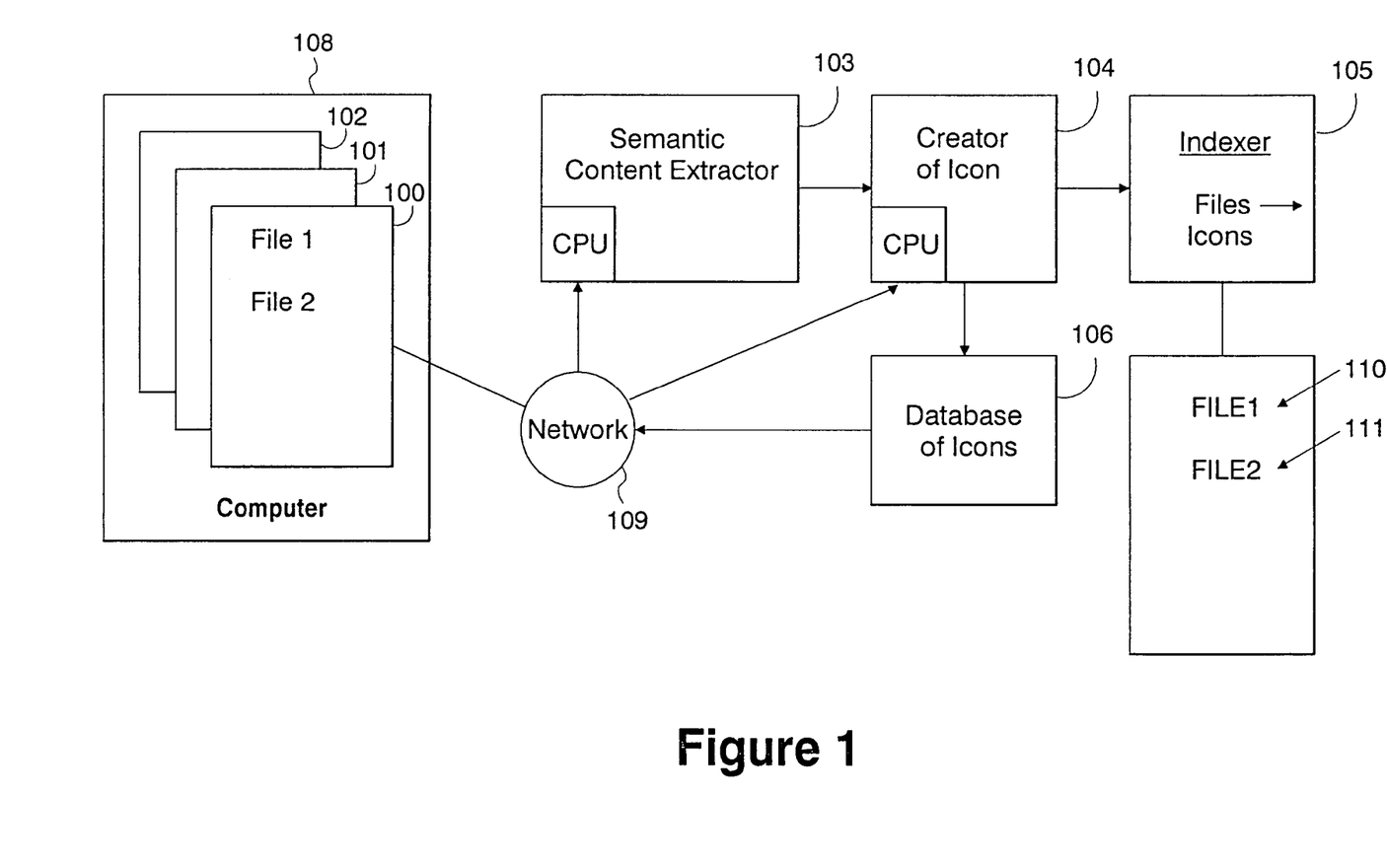
FIG. 1 is a block diagram illustrating the present invention.

FIG. 1 is a block diagram explaining the icon process. 108 is a computer that represents a group of directories. 100 represents one directory in one location, 101 represents a second directory in a second location, and 102 represents a third directory in a third location. Each directory has a group of files listed as file 1, file 2, and so on. In a computer, a module is running, 103, the Semantic Content Extractor. 103 can exist within a user's computer, but in this drawing it exists in a server connected to a network, 109. 103, has a running CPU, which extracts the information and content from all the files, 100–103. 104 is responsible for creating an icon using the information provided by the Semantic Content Extractor. Icons may include advertisements, for example if the content is IBM computers, an ad for IBM computers may be presented, and the ad may be a hyperlink to IBM's WEB page. These icons can also be on a separate server as the Semantic Content Extractor. In order to create icons, 104, uses the database of icons, 106, which has a thorough list of icons. The database of icons, 106, is connected to the network, 109. The icons are created by creator of icons module 104. In the module 105, the index of icons to files (or parts of icons to different parts of a text) is created. This indexer module 105 can also be located on a server. The indexer creates an icon and attaches it to a file, 110 and 111.

There are numerous methods for extracting the content or topic of text documents or portions of documents. These methods include identifying the number of times a particular word appears in a text or by latent semantic indexing as is known to those skilled in the art.

Figure 2:
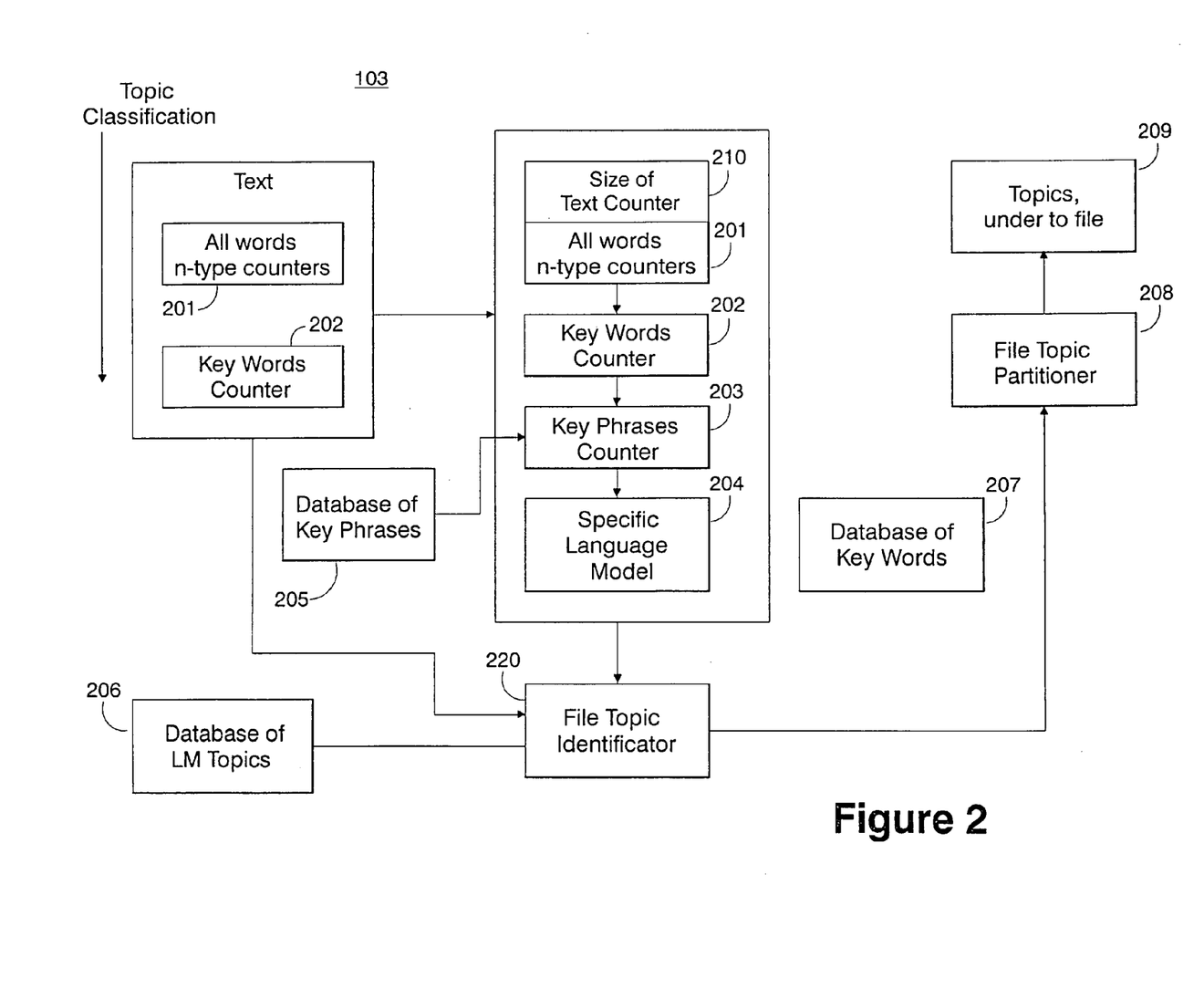
FIG. 2 describes the structure of a semantic content extractor that may be used in the practice of this invention.

FIG. 2 describes the structure of the Semantic Content Extractor. This is responsible for being able to choose appropriate data to be able to make an icon. 200 represent the input text in a file. 210 determines the size of the text. This can be done by checking the byte size of the file. 201 counts words and characters that can be added up to create an approximation for byte size. In order to speed up the counting process, a key word counter 202 can be created to count key words. Key words are words that are essential to represent the meaning of the file. Key words do not include words that are typical for any file (such as and, or, but, the, and so on.). 207 is a database of key words that is created from other documents. 203 speeds up the keyword counting process by counting key phrases used in the text. 205 represents the database of key phrases which holds all key phrases that were obtained from a training database (or from processing textual files in past). 204 produces LM from counts that were produced by counting modules 210, 201, 202. The process of making language models (LMs) from counts is described in the reference: Frederick Jelinek, "Statistical Methods for Speech Recognition", The MIT Press, Cambridge, Mass. 1998.

206 is the database of language models that were created from different texts (belonging to different topics—for each topic one LM is made. For example, LM on a medical topic, LM related to travels etc.). 220, is the topic identificator. It defines which language models provide higher likelihood scores (or likelihood ratios) for input texts 200. Since each LM is associated with a topic, it allows to classify each textual part with the topic.

If there are several parts in the text that are marked with the different topics, it can be used to associate several topics with the text and make a composite icon that points to different parts of the text with different topics.

The method for classification and segmentation of a text by topics using likelihood ration is described in the patent application Ser. No. 09/124,075, for "Real Time Detection of Topical Changes and Topic Identification via Likelihood Based Methods", filed on Jul. 29, 1998.

This process will help create a composite icon, which will allow a better access. 208, the file topic divider, divides the files into their necessary parts and helps create an icon. 209 creates an index of icons to files or an index of parts of icons to different parts of the text.

Figure 3:
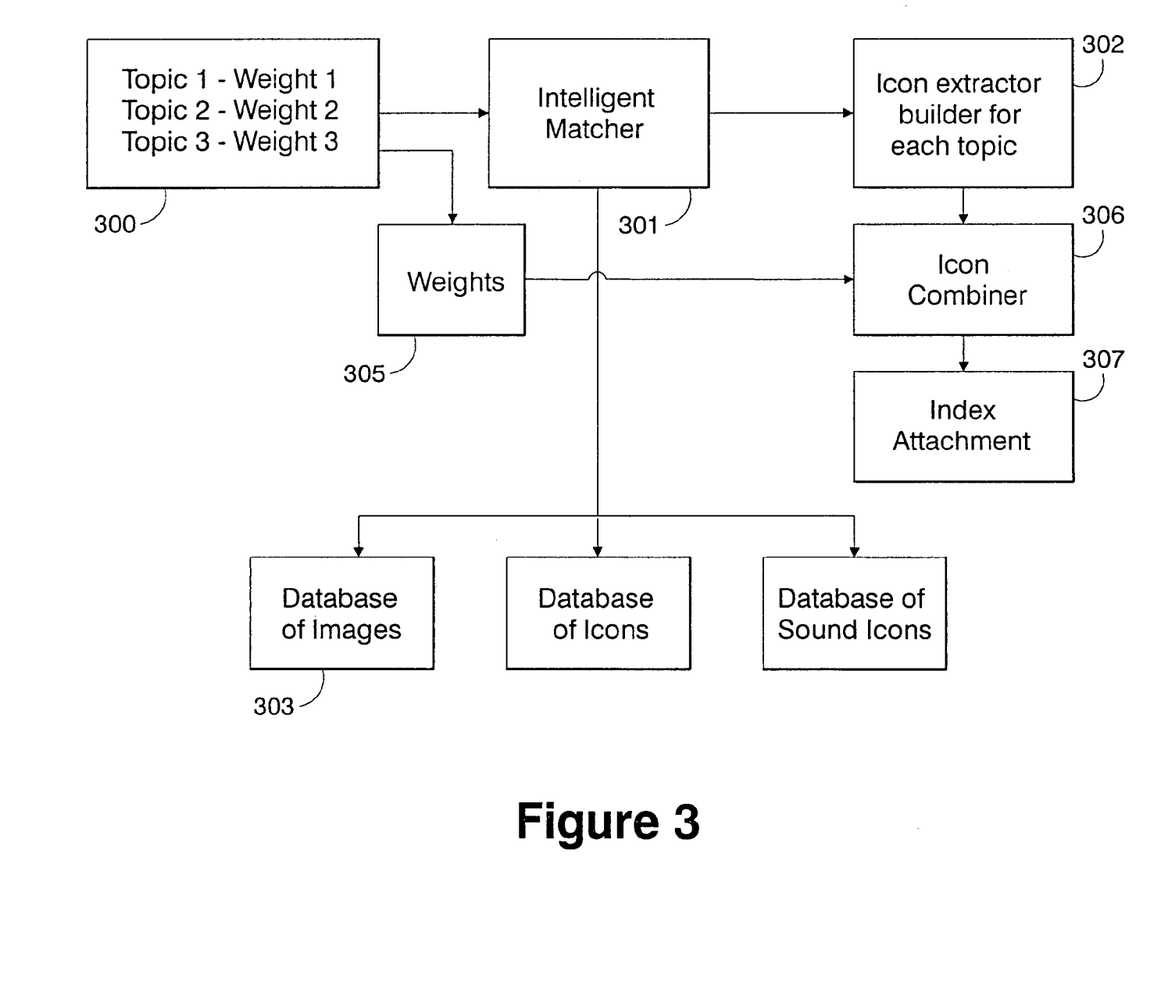
FIG. 3 illustrates the structure of an icon creator that may be used in this invention.

FIG. 3 illustrates the structure of the icon creator. 300 contains topics that were within the Semantic Content Extractor. Topics 1 through 3 have weights listed under them. These weights stand for the importance and significance of topics that are associated with a file. 301 is the intelligent matcher that creates a match of data and images to create an icon. This is done using the database of images 303 and the database of icons 304. The database of images is used only if there is no matching icon for the data given. For example, if there were a topic concerning a car, the computer would search through the database of icons 304. If an icon were not found, one would be created using the database of images 303. 302 extracts an icon that best fits the data given and then creates it to fit a desktop or directory.

306, according to the weight 305 of a topic, the icon combiner creates similar topic icons according to their weight and content. 307, each icon has an index attachment. This attachment to the file opens directly to the file, thus creating easy access to any desired file. This method for opening a file is very effective. Although for blind people, another method of opening files can be created. A blind person can use a sound icon using the database of sound icons 308. This would enable the blind user to use their sense of hearing to choose the files they wish to open.

Figure 4:
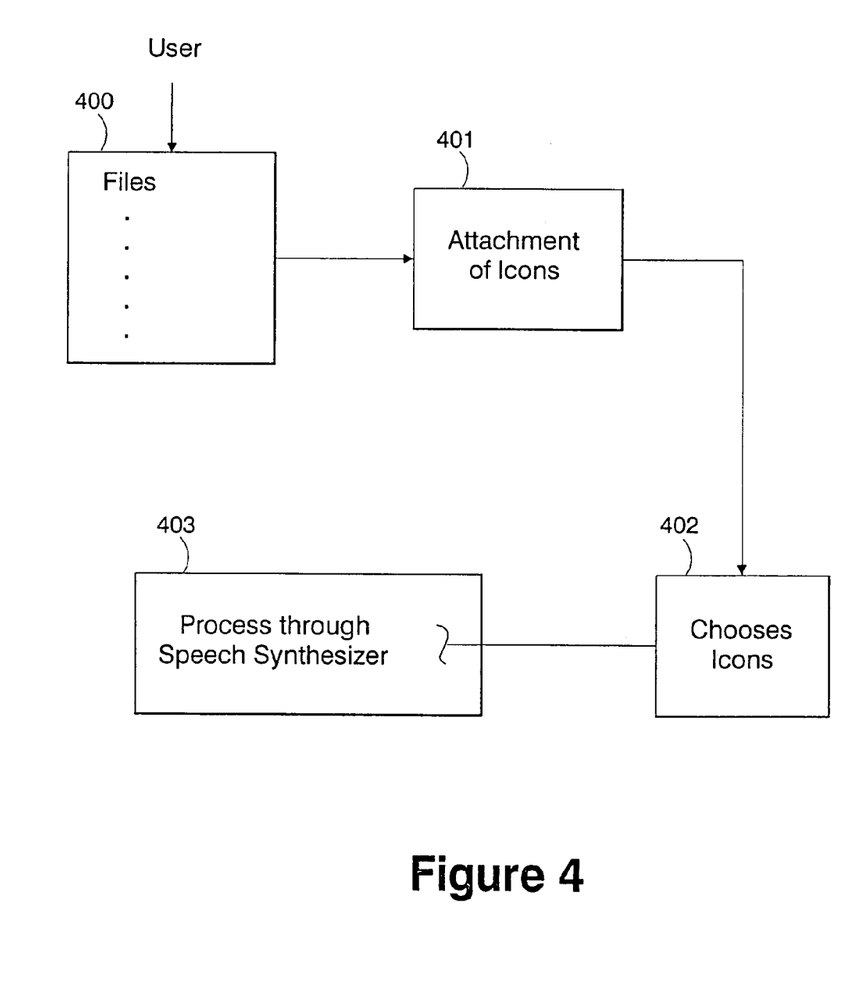
FIG. 4 shows how a person with a reading disability can use the icon system of this invention.

FIG. 4 gives an illustration of how a person with a reading disability can use this icon system. 400 is a group of files that are formed into an icon attachment 401. The user then chooses an icon 402, using the pictures or sounds, and the user can then use a speech synthesizer 403 and can listen to a file.

Figure 5:
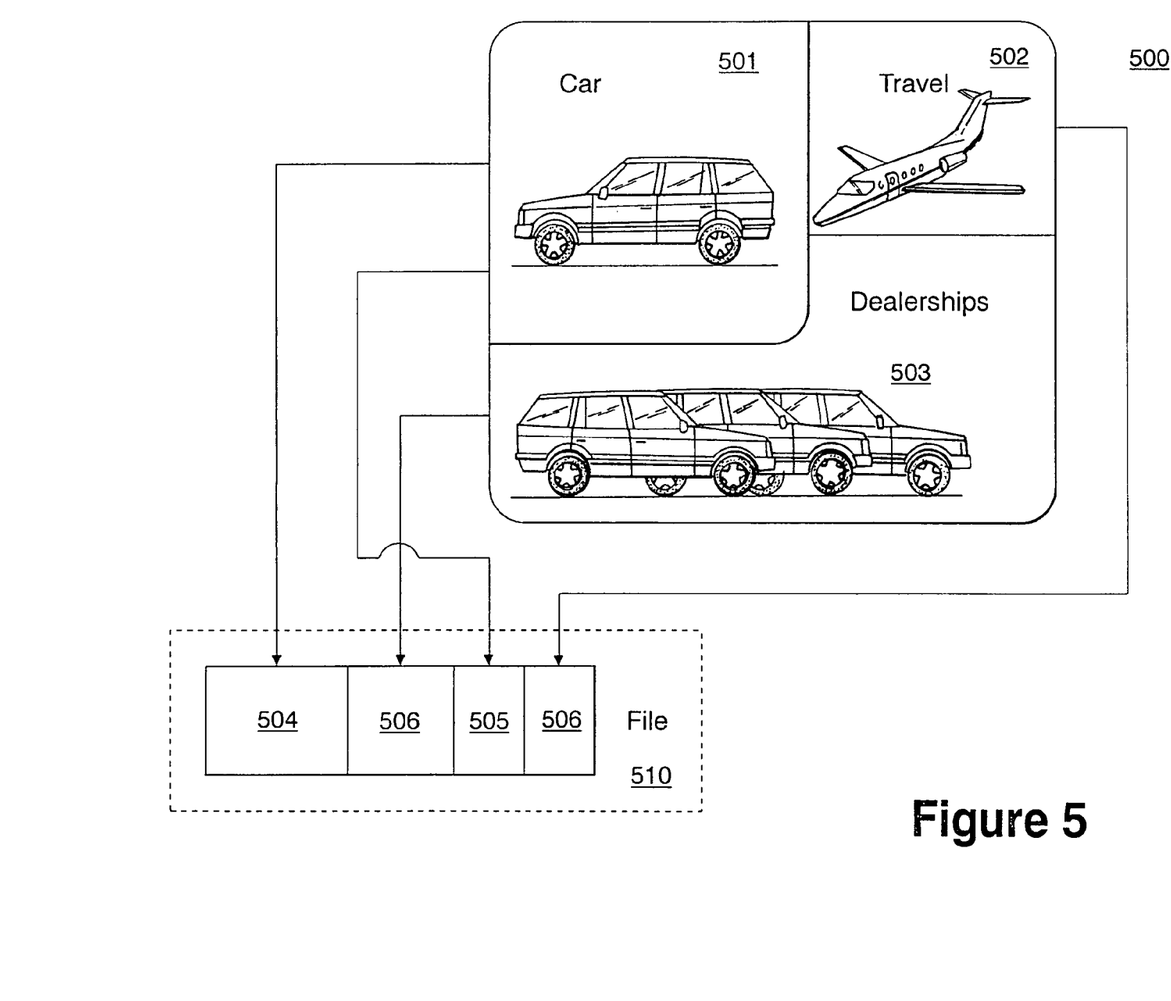
FIG. 5 gives an example of composite icons that represent multiple topics.

FIG. 5 gives an example of composite icons that contain multiple topics. 500 shows an icon containing multiple topics, such as cars and travel, 501 and 502, and dealerships 503. 501, the larger part of the file shows cars, the smaller part of the file shows travel. The intermediate sized part of the file shows dealerships. 503 contains an index which lists information on cars or buildings 506. 504 shows where the information on cars is placed in the file. Using a fraction method, the files can be broken down, as shown in 504 and 505. 510 shows the file.

Figure 6:
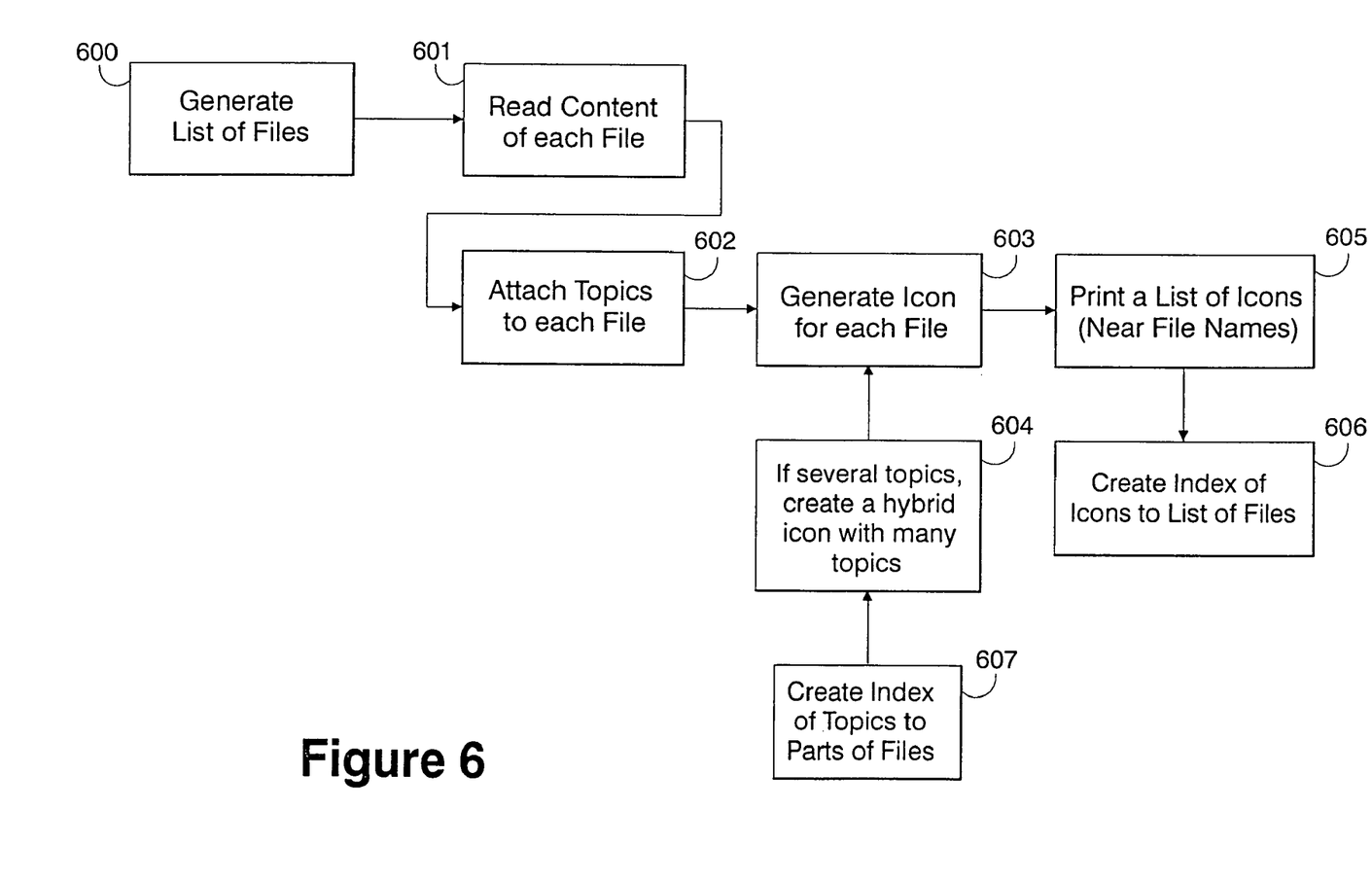
FIG. 6 is a flow chart illustrating a method embodying this invention.

FIG. 6 shows a flowchart of the method. At 600, a list of files is generated. Step 601 reads the content of each file, and at 602, topics are attached to each file. At 603, icons are generated for files. At 604, if several topics, a composite icon is created containing many topics. At 607, an index of topics is created. At 605, a list of icons is printed near file names. At 606, a list of icons can be created to list files.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A system for determining and displaying icons representing text files, comprising:
   a content extractor for determining a plurality of topics of a text file by examining words in the file;
   a means for associating a respective one of a plurality of topic icons with each of the plurality of topics;
   means for assigning weighted values to each of said plurality of topics;
   a selector for selecting a respective one of the plurality of topic icons to represent each of said plurality of topics of the text file on the basis of weighted values assigned to said topics; and
   means for creating a composite icon including the selected ones of said plurality of topic icons; and
   a display for displaying the at least one of said composite icon to represent the text file; and
   wherein each of the tonic icons of the composite icon has a separate index attachment which opens directly to information in the text file represented by said topic icon.

2. A system according to claim 1, wherein the selector includes means for selecting the closest ones of said plurality of icons to represent the text file.

3. A system according to claim 1, wherein:
   each of the plurality of topics is associated with a respective one part of the text file; and
   each of the selected plurality of icons, in the composite icon, points to the part of the text file associated with the topic that is associated with the icon.

4. A system according to claim 1, wherein the selected icons are sensed by different senses.

5. A system according to claim 1, wherein the icons facilitate use of a computer by people with various disabilities.

6. A system for representing contents of computer files via icons, the system comprising:
   a computer memory including a group of directories with lists of files;
   a semantic content extractor for determining a plurality of topics of each of the files from an examination of words in the files; and
   a module for creating a plurality of topic icons representing the files including:
   a means for associating a respective one of the topic icons with each of the determined topics, means for assigning weighted values to each of said plurality of topics, and means for selecting topic icons to represent the files based on the weighted values assigned to said determined topics; and
   means for creating, for each of the files, a composite icon including the plurality of topic icons associated with the topics of the file, and wherein each of the topic icons of the composite icon for said each of the files has a separate index attachment which opens directly to information in said each file represented by said topic icon.

7. A system according to claim 6, wherein the semantic content extractor includes:
   a module that associates with a text file a language model, and word, key words and key phrases counts;
   a topic identifier that uses the language model and counts to identify a topic; and a module that partitions a text in a file by topic count.

8. A system according to claim 7, wherein the topic identifier uses likelihood ratio to partition texts in parts by topics; likelihood in this ratio are defined by using probabilities of words from language models of the text in a file and language models for various topics that are stored in the database.

9. An icon creator for creating icons and selecting icons for representing a file, comprising:
   a semantic content extractor for identifying the importance and significance of a plurality of topics associated with th& file based on an examination of words in the file; and
   a matcher to create a match of data and images to create a multitude of topic icons using a database of images and a database of icons, including:
   a means for associating a respective one of the topic icons with each of the topics, means for assigning weighted values to each of said plurality of topics, and means for selecting a plurality of the created topic icons to form a composite icon to represent the file based on the weighted values assigned to the identified topics; and
   wherein each of the selected topic icons of the composite icon has a separate index attachment, which opens directly to information in the file represented by said selected topic icon.

10. An icon creator according to claim 9, wherein a blind person can use a sound icon using the database of sound icons; this would enable the blind user to use their sense of hearing to choose the file they wish to open.

11. An icon creator according to claim 9, further comprising means to allow a person with a reading disability to use the icon system, including a group of files that are formed into an icon attachment; the user then chooses an icon, using the pictures or sounds and the user can then use a speech synthesizer can listen to a file.

12. An icon creator for creating an icon representing a file, said file including a larger part showing cars, a smaller part showing travel, and a middle sized part showing dealerships, the icon creator comprising:
   a semantic content extractor for identifying the importance and significance of topics associated with the file based on an examination of words in the file;
   a matcher to create a match of data and images to create composite icons using a database of images and a database of icons; wherein said composite icons contain multiple topics including cars and travel, and dealerships; and
   means to contain an index which lists information on cars or building, means to show where the information on cars is placed in the file; and wherein, using a fraction method, the files can be broken down;
   wherein each icon has an index attachment, which opens directly to the file.

13. A method for creating icons, comprising:
   generating a list of files;
   reading the word content of each file; for each file,
   i) attaching a plurality of topics to the file based on the read word content of the file;
   ii) generating a plurality of topic icons for the file based on the topics attached to the file;
   iii) creating a composite icon for the file from the plurality of topic icons generated for the file; and
   iv) using said plurality of topic icons in the composite icon to point to different parts of the file having the different topics associated with said plurality of topic icons;
   creating an index of topics;
   printing a list of topic icons near file names; and
   creating a list of topic icons to list files; and
   wherein each of the topic icons of the composite icon has an a separate index attachment which opens directly to information in the file represented by said topic icon.

14. A program storage device readable by machine, tangibly embodying a program of instructions executable by the machine to perform method steps for determining and displaying icons representing files containing text, said method steps comprising:
   determining a plurality of topics of a file by examining words in the file;
   searching a database of topic icons;
   assigning weighted values to each of said plurality of topics, including:
   associating a respective one of the topic icons with each of the topics, assigning weighted values to each of said plurality of topics, and selecting topic icons to represent the file based on the weighted values assigned to said determined topics;
   creating a composite icon for the file, said composite icon including the topic icons associated with the topics of the file;
   displaying the composite icon to represent the file; and
   wherein each of the topic icons of the composite icon has a separate index attachment which opens directly to information in the file represented by said topic icon.

15. A program storage device according to claim 14, wherein in the database, each icon is associated with words, and wherein:
   the determining step includes the sep of using a semantic content extractor to identify the importance and significance of topics associated with the file; and
   the selecting step includes the step of comparing said topics with the words in the database to select one of the icons to represent the file.

16. The system in claim 1, where the icons contain advertisements, which include hyperlinks.

17. The system in claim 16 where users pay less for the system if advertisements are included.

18. The system in claim 16 where an advertiser pays a manufacturer or seller of the system for including said advertisements in the icons.

* * * * *

UNITED STATES PATENT AND TRADEMARK OFFICE
CERTIFICATE OF CORRECTION

PATENT NO. : 7,003,736 B2  Page 1 of 1
APPLICATION NO. : 09/770978
DATED : February 21, 2006
INVENTOR(S) : Alexander Zlatsin et al.

It is certified that error appears in the above-identified patent and that said Letters Patent is hereby corrected as shown below:

Column 5, Line 58, Claim 1:
"tonic icons" should read -- topic icons --

Column 6, Line 49, Claim 9:
"th&" should read --the --

Column 7, Line 42, Claim 13:
"an a separate" should read -- a separate --

Column 8, Line 28, Claim 15:
"the sep" should read -- the step --

Signed and Sealed this

Twenty-ninth Day of August, 2006

JON W. DUDAS
*Director of the United States Patent and Trademark Office*